Feb. 27, 1962 D. A. WELLS 3,023,298
ELECTRIC BROILER
Filed March 21, 1960 3 Sheets-Sheet 1

INVENTOR
DONALD A. WELLS

BY Taylor + Neal
ATTORNEYS

Feb. 27, 1962 D. A. WELLS 3,023,298
ELECTRIC BROILER
Filed March 21, 1960
3 Sheets-Sheet 2

INVENTOR
DONALD A. WELLS
BY Naylor & Neal
ATTORNEYS

INVENTOR
DONALD A. WELLS
BY Naylor & Neal
ATTORNEYS

United States Patent Office 3,023,298
Patented Feb. 27, 1962

3,023,298
ELECTRIC BROILER
Donald A. Wells, Lafayette, Calif.
(220 9th St., San Francisco, Calif.)
Filed Mar. 21, 1960, Ser. No. 16,314
20 Claims. (Cl. 219—37)

This invention relates to an apparatus for cooking food and more particularly to an electric broiler.

It is a principal object of this invention to provide an electric broiler on which food may be broiled on a grate of heated metal bars thereby producing cooked meat having an appearance similar to the appearance of meat broiled on charcoal broilers.

It is another object of this invention to provide such an electric broiler in which juices dripping from the meat during cooking are subjected to intense heat whereby they are vaporized and burned to produce a cooking atmosphere containing smoke and vaporized fats.

It is another object of this invention to provide such an electric broiler which is very simple to use in that it has a minimum number of controls; it reaches operating conditions as rapidly as possible when first turned on; it consumes a minimum amount of electric power, and it may be cleaned very easily after use.

It is another object of this invention to provide an electric broiler which is very easily manufactured and repaired.

Another object of this invention is to provide an electric unit with a two-fold purpose. One as an electric broiler appliance as described above and the other object is to use this unit as an electric range, thus placing pots, pans, stock kettles, etc., directly upon the grate of heated metal bars.

Other objects and advantages of the present invention will become apparent from the following description read in conjunction with the attached drawings, in which.

Figure 1:
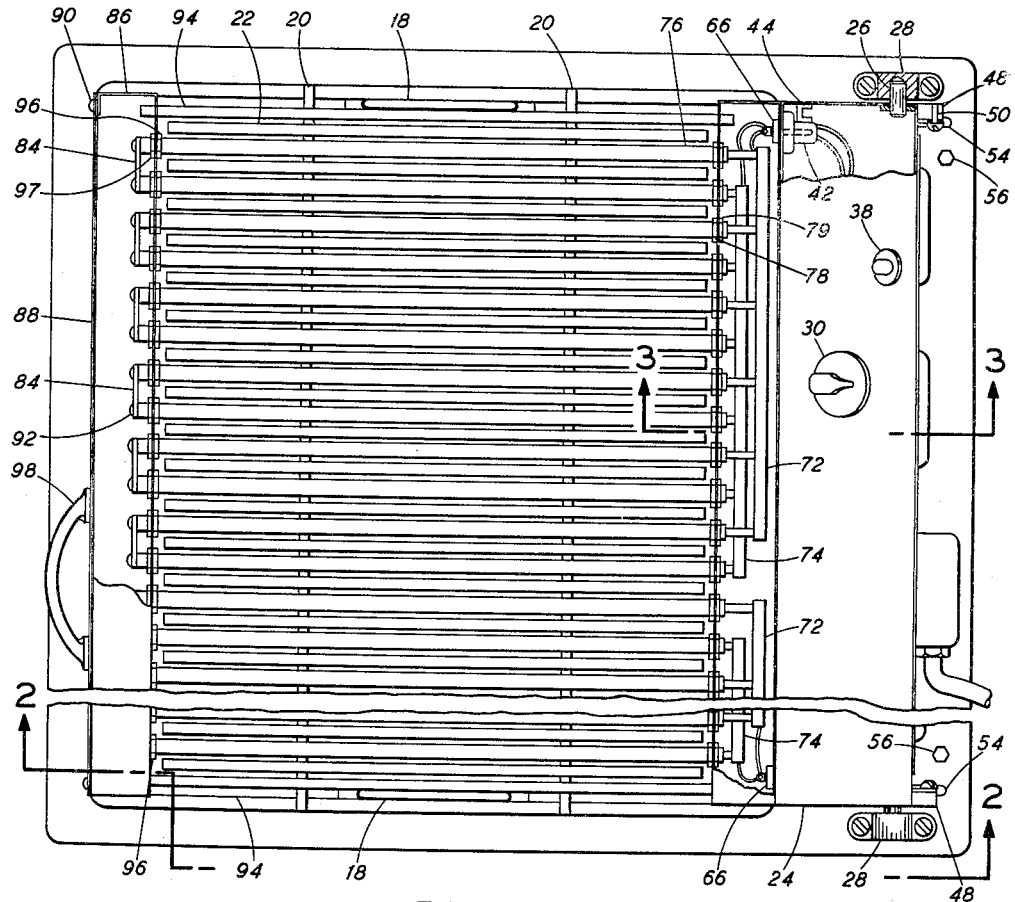
FIGURE 1 is a plan view of the apparatus of this invention with a portion thereof broken away.

Referring now in detail to the drawings and particularly to FIGURES 1 through 5, the electric broiler of this invention comprises a housing 10 having an opening in the top thereof surrounded by an upwardly extending lip 12 with a drip pan 14 suspended in such opening and having a curved lip 16 around the top thereof which embraces the top of lip 12. A pair of handles 18 are provided on opposite sides of pan 14 to facilitate removal of pan 14 from the housing. A pair of grid supporting bars 20 rest on the top of pan 14 and carry welded to the tops thereof a series of twenty-five parallel grill bars 22 forming a cooking grid over pan 14.

Figure 5:
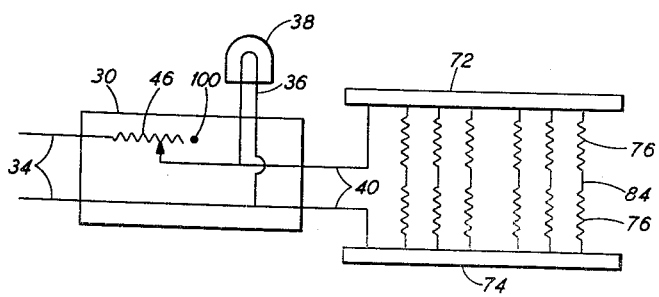
FIGURE 5 is a schematic diagram of the electrical components of the apparatus of FIGURES 1 to 4.

A control box 24 is pivotally mounted on housing 10 by means of pivot pins 26 mounted in journals 28. A pair of control switches 30 and 32 are mounted in control box 24 and are adapted to receive electrical power from electrical leads 34 (see FIGURE 3). A pair of leads 36 connects a pilot lamp 38 to each switch 30 and 32, and pair of leads 40 extends from each switch 30 and 32 to a female electrical plug 42 mounted on the edge of control box 24 by means of U-shaped bracket 44. As illustrated in FIGURE 5, each switch 30 and 32 includes a variable resistor 46 which is adapted to control the supply of current to the circuit created by connection of the remainder of the equipment to be described hereinafter across the leads 40.

Control box 24 carries a pair of ears 48 at the rear corner thereof provided with pin 50 extending therefrom, and a tension spring 52 is connected over each of the pins 50 and extends downwardly through an opening 54 in the top of housing 10 to be connected at a lower end to a suitable securing ear in the base of housing 10. When control box 24 is rotated about pivot pin 26 to a position removed 90° clockwise from a position illustrated in the drawings, tension spring 52 maintains control box 26 in such position. A pair of vertical stops 56 are provided on the rear portion of the top of housing 10 positioned to intercept the back wall of control box 26 and prevent control box 26 from being rotated by springs 52 further than 90° from the position illustrated in FIGURE 3.

A body 58 is mounted on the front of control box 24 and forms a detachable part of control box 24. Body 58 comprises a water-tight chamber having a removable bottom plate 60 thereon held on body 58 by means of screws 62. An electrical plug 64 is mounted on each end of body 58 in position to engage in electrical socket 42. Electrical plug 64 is rigidly mounted on body 58 by means of nut 66 on the interior of body 58 in order that plug 64 in cooperation with socket 42 and support member 44 will provide rigid support for body 58 on control box 24.

Figure 3:
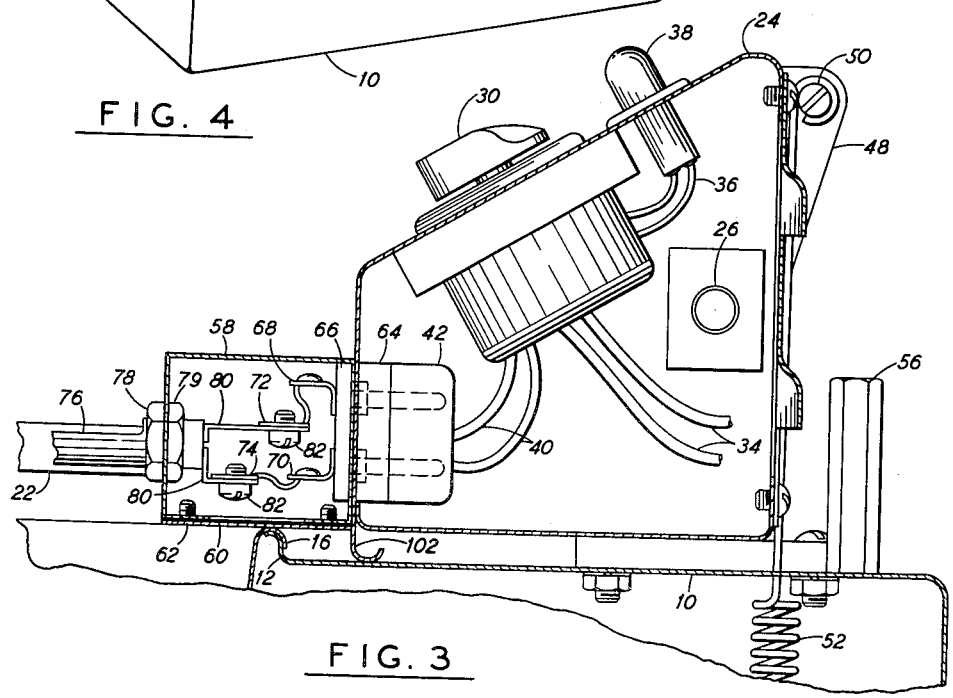
FIGURE 3 is a vertical sectional view of the apparatus of FIGURE 1 taken along the plane and in the direction indicated by the line and the arrows at 3—3 in FIGURE 1.

As illustrated in FIGURE 3, both of the electrical plugs 64 are provided with contacts 68 and 70 inside body 58 which are electrically connected to electrical buss bars 72 and 74, respectively, inside of body member 58.

A series of parallel heating elements 76 are mounted on the front of body 58 by means of bolts 78 and 79 on the outside and inside respectively of body 58 and are connected alternately, one to buss bar 72, the next to buss bar 74, the next to buss bar 72, etc. This connection is effected by the provision of an electrical lead 80 on the end of each heating element 76 which is connected to the corresponding buss bar by a screw 82. The heads of screws 82 face removable wall 60 of body 58 to facilitate replacement of burned out heating elements. Heating elements 76 are elongated parallel resistance heating rods encased in generally cylindrical sheaths, each end of the sheath being threaded to receive a lock nut thereon.

Figure 2:
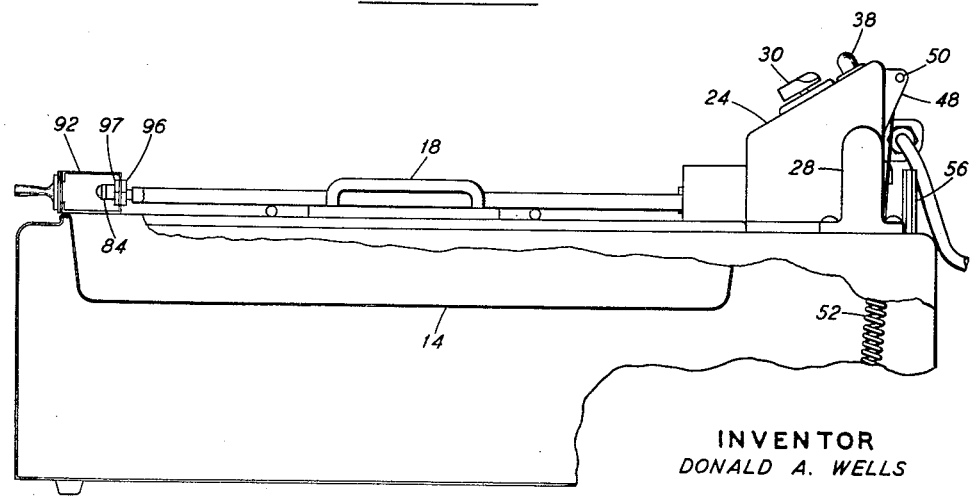
FIGURE 2 is a side elevational view of the apparatus of FIGURE 1 with a portion thereof broken away.
Figure 4:
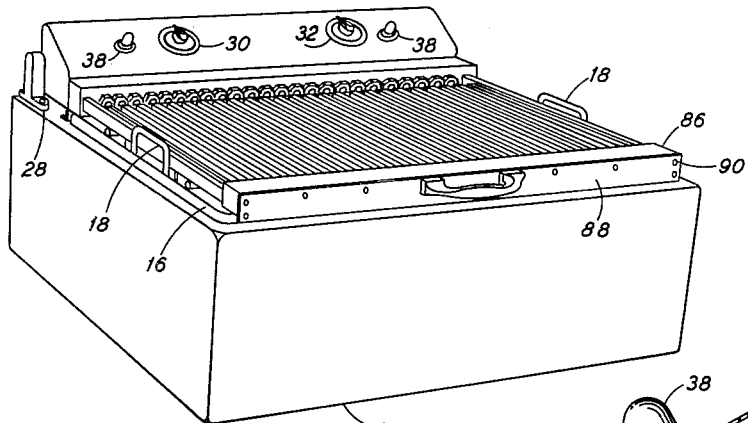
FIGURE 4 is a perspective view of the apparatus in FIGURES 1 and 3.

As illustrated in FIGURES 1 and 2, the heating elements 76 lie between grill bars 22 with the top surfaces of heating elements 76 slightly below the top surfaces of grill bars 22 and the bottom surfaces of heating elements 76 slightly above the bottom surfaces of grill bars 22. Adjacent heating elements 76 are electrically connected together by means of conductors 84 at their ends remote from body 58 in order that the heating elements 76 may be connected across buss bars 72 and 74, with two adjacent heating elements connected in series and adjacent pairs of heating elements connected in parallel, as illustrated in FIGURE 5.

A cover member 86 is provided over the ends of heating elements 76 remote from body 58, cover 86 being water-tight and provided with a removable end 88 attached to the remainder of cover 86 by means of screws 90 in order that end 88 of cover 86 may be removed for access to heating elements 76 in order that screws 92 connecting heating elements 76 to conductors 84 may be removed. Cover 86 is rigidly mounted on body member 58 by means of rigid bars 94 at opposite ends of body 58.

Nuts 96 on the outside of member 86 are provided on heating elements 76 to cooperate with nuts 97 on the inside of member 86 to rigidly space heating elements 76 to cover 86.

A handle 98 is mounted on cover member 86 in order to facilitate the lifting of cover member 86 to pivot control box 24 about pins 26.

In operation, the electric broiler of this invention is controlled simply by setting control knobs 30 and 32 at the desired cooking temperature. Control knobs 30 and 32 may be set at the same temperature to provide a broiling surface the entire width of the machine or they may be set at different temperatures to provide different temperature broiling surfaces, or, of course, one control knob 30 may be turned on to a desired cooking temperature while the other knob is turned off to provide a broiling surface over half the width of the machine. The setting of control knob 30 turns on pilot light 38, as illustrated in FIGURE 3, and indicates which half of the broiling surface is in operation. Electrical current supplied to the heating elements 76 causes them to heat up and heat the grill bars 22 between them by radiant heat. Because heating elements 76 are closely spaced to bar 22 and because the top surfaces and bottom surfaces of heating elements 76 lie respectively below and above the top surfaces and bottom surfaces of grill bar 22, the radiant heat from heating elements 76 is used most efficiently to heat grill bar 22. Furthermore, since the top surfaces of heating elements 76 lie below the top surfaces of grill bars 22, the heating elements 76 are not subjected to wear by the use of ordinary cooking implements such as spatulas on the grill bars 22. When meat is placed on top of the grill bars 22, it will be heated directly by the radiant heat from heating elements 76 and by conduction of heat from grill bars 22 on which it rests, thus providing a striped grilled surface of the meat. As the meat is heated during broiling, fat which drips from the meat between grill bars 22 is vaporized and burned by contact with heating element 76 thereby producing an atmosphere of vaporized fat and smoke about the meat which is being broiled and imparting to the meat the flavors of natural broiling.

When use of the machine for broiling foods has been completed, control knob 30 is turned to its off position in which the movable contact of rheostat 46 (see FIGURE 5) is connected to contact 100, and heating elements 76 proceed to cool off. While heating elements 76 are cooling off, handle 98 may be raised to rotate control box 24 90° clockwise, as illustrated in FIGURE 3, until the back of control box 24 contacts stop elements 56, and spring 52 maintains control box 24 in such rotated position with heating elements 76 extending vertically from control box 24. With heating elements 76 rotated upwardly out of the space between grill bars 22, the grill bars 22 and drip pan 14 may be removed from the machine and immersed in any bath of washing water, cleaning them for subsequent use; the drip pan 14 and grill bars 22 may then be returned to the machine. When heating elements 76 have cooled sufficiently that they will not be damaged by immersion in water, heating elements 76 are removed from the machine by detaching body 58 from control box 24. Since body 58 and cover 86 are both waterproofed, the detached unit of heating elements 76 may be immersed in any suitable bath of washing water, washed and returned to the machine.

When one of the heating elements 76 burns out, it may be replaced very easily by removing plate 60 from body 58, loosening the screw 82 by which the burned out heating element is connected to buss bar 72 or 74, removing front plate 88 of cover 86 to detach the screw 92 by which the burned out heating elements 76 are connected to conductor 84. The nuts 78 and 96 are then loosened to permit the heating element to be removed from the space between body 58 and cover 86, and the procedure for removing the heating element is reversed for installing a new heating element. Each burned out heating element 76 may thus be replaced without affecting the remainder of elements 76.

When the unit of heating elements 76, body 58 and cover 86 has been removed from control box 28, it is convenient to leave control box 24 in its upwardly rotated position. However, if the operator so desires, the control box can be rotated to the position illustrated in the drawings, for which purpose a foot member 102 is provided on the bottom of control box 24 positioned to contact the top of housing 10 and maintain control box 24 in the position illustrated in FIGURE 3 in order that body 58 and plugs 64 may be connected to control box 24 without rotating control box 24.

Figure 6:
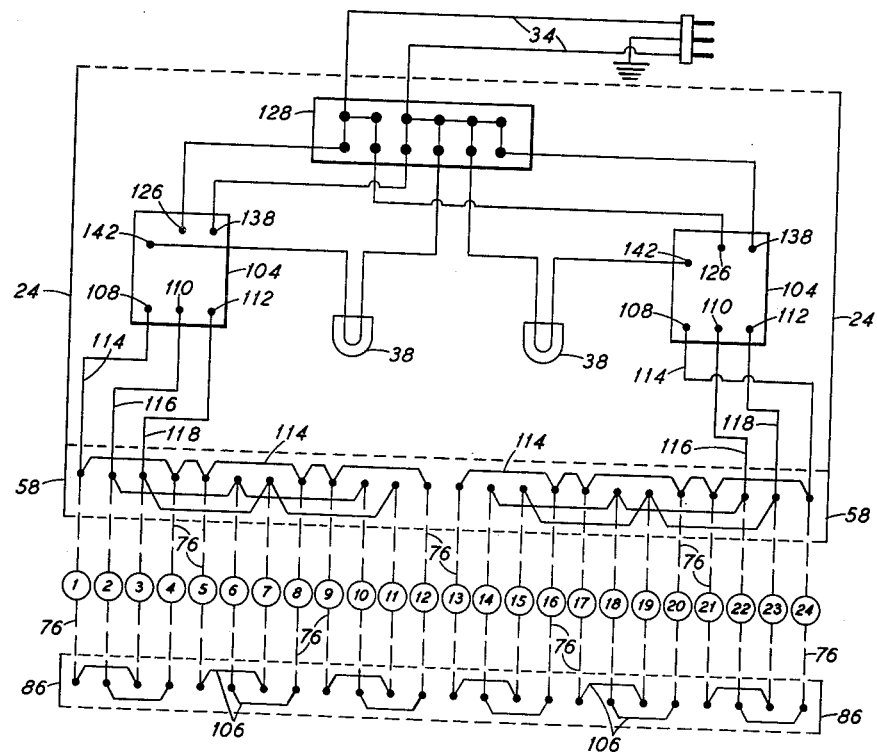
FIGURE 6 is a schematic diagram of the electrical components of an alternative and preferred form of apparatus of this invention.
Figure 7:
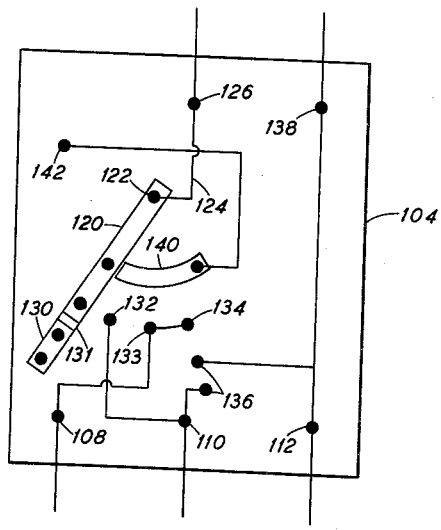
FIGURE 7 is a more detailed schematic diagram of one component of the apparatus of FIGURE 6.

The alternative form of the invention illustrated in FIGURES 6 and 7 is very similar to the form illustrated in FIGURES 1 to 5 differing from the latter in that body 58 is permanently mounted on control box 24, and heating elements 76 are electrically connected together in a unique fashion permitting the use of the three-range electrical control switch 104 of FIGURE 7 to provide three ranges of heating conditions for broiling meat on the grill bars 22. In this preferred form of the invention, pairs of heating elements 76 are electrically connected in series as they are in FIGURES 1 and 5, but in FIGURE 6, adjacent pairs of heating elements 76 overlap, the conductors 106 in cover member 86 connecting the first and third, second and fourth, fifth and seventh, etc., heating elements 76 as illustrated, the twenty-four heating elements being numbered as illustrated.

The paired heating elements 76 are connected to three terminals 108, 110, and 112 of switch 104 by means of leads 114, 116, and 118 respectively, lead 114 being connected to one heating element of each pair, and leads 116 and 118 being connected to the other heating elements of the pairs so as to divide the pairs of heating elements 76 into two groups. Connection of terminals 110 and 112 to the electrical leads 34 extending from the machine supplies electrical current in series through the two groups of heating elements 76 in FIGURE 6, and connection of terminals 108 and 112 to leads 34 supplies current through the odd numbered heating elements 76. Connection of terminal 108 to one lead 34 and connection of terminals 110 and 112 to the other lead 34 supplies current in parallel through the two groups of heating elements. These three connections effect "low," "medium" and "high" heat outputs respectively of the heating elements, with the joint resistance of the heating elements twice as great for the "medium" connection as for the "high" connection and twice as great for the "low" connection as for the "medium" connection.

As illustrated in FIGURE 7, the three-range electrical switch 104 is capable of effecting the electrical connections just mentioned and in addition effecting the lighting of pilot light 38 when any of the heating elements 76 are receiving current. Switch 104 comprises a conductor arm 120 pivotally mounted about pivot pin 122 which is connected by a conductor 124 to a terminal 126; terminal 126 is connected to one of the leads 34 through junction box 128 as illustrated in FIGURE 6. A suitable manipulating knob (not shown) is connected to arm 120 to rotate arm 120 between four positions, namely positions for "off," "low," "medium" and "high" heats; arm 120 is illustrated in FIGURE 7 in its off position. Arm 120 carries a conductor 130 on the end thereof insulated from the remainder of the arm by insulator 131. Three electrical contacts 132, 133, and 134 are provided to be connected to terminal 126 by arm 120 in the "low," "medium" and "high" positions of the switch respectively. Contact 132 is connected to terminal 110, and contacts 133 and 134 are connected to terminal 108. A pair of contacts 136 are positioned to be connected by conductor 130 in the "high" position of arm 120, connection of contacts 136 effecting connection of terminal 110 to terminal 138 which is connected to the other of the leads 34 through junction box 128. Terminal 112 is permanently connected to terminal 138. A metal slide conductor 140 is positioned to contact arm 120 in all positions except its "off" position, and slide 140 is connected to terminal 142 of the switch to effect lighting of pilot light 38 whenever any of the heating elements are receiving current.

Obviously many other specific three-range switches may be employed in the device, the choice of the particular switch forming no part of this invention.

The form of the invention illustrated in FIGURES 6 and 7 provides a very efficient three-range heat control for grill bars 22, each grill bar being heated by two warm heating elements for low heat, by one hot heating element for medium heat, and by two hot heating elements for high heat. By the provision of the two independent sets of twelve heating elements 76 and the two switches 104, the machine may be employed to produce two areas of equal or unequal heat. In some cases it may be desirable to provide a single three-range switch for controlling all twenty-four of the heating elements. Since the body 58 and control box 24 in FIGURE 6 are permanently mounted together, the machine of FIGURES 6 and 7 is subject to very rugged construction making it most desirable for restaurant use where it is subject to the extremes of wear and tear. Body 58, control box 24, and cover 86 are grease tight to prevent carbonization and short circuiting of the electrical components therein, but these members need not be absolutely water-tight; for a commercial machine of this type, cleaning of the heating elements with a wire brush by the usual kitchen cleaning employees is satisfactory and it is not necessary that the heating elements be immersed in the dishpan as the housewife prefers.

Both forms of the electric broiler of this invention are very efficient, providing maximum use of the heat generated by heating elements 76 and providing maximum simplicity for operation, cleaning and repair. In addition, the broiler may be converted very readily to a grill by the simple expedient of placing a removable metal sheet, of sufficient thickness to prevent buckling, over the set of grill bars 22, thus providing a smooth flat metal surface on which food may be grilled.

What is claimed is:

1. An electric broiler comprising a housing, a drip pan mounted on said housing, a generally horizontal grid of grill bars mounted over said pan, a plurality of heating elements removably disposed between said bars of said grid with adjacent grill bars separated by one heating element and with the top surfaces of said heating elements disposed below the top surface of said bars, said heating elements being removable upwardly out of and away from said grid, an electrical control box above said housing adjacent to said pan and supporting said heating elements, and electrical control means in said control box for controlling the supply of electrical current through said heating elements.

2. The electric broiler of claim 1 having means pivotally connecting said control box to said housing about a horizontal axis to permit said control box and said heating elements to be rotated about said axis upwardly away from said grid.

3. The electric broiler of claim 2 having spring means for supporting said control box and said heating elements in an upwardly rotated position in which said heating elements are remote from said grid.

4. The electric broiler of claim 1 in which said control box contains electrical conductors for connecting said heating elements to both leads of a source of electrical current and a current control for controlling the quantity of electrical current passing through said conductors.

5. The electric broiler of claim 4 in which said control box comprises first and second bodies detachably mounted together, said first body is pivotally mounted on said housing for rotation upwardly about a horizontal axis, said heating elements are supported by said second body, and said second body is removably mounted on said first body by said conductors.

6. The electric broiler of claim 1 in which the sides of said heating elements lie closely adjacent to the sides of said grill bars, and the lower surfaces of said heating elements lie above the lower surfaces of said grill bars.

7. The electric broiler of claim 1 in which said heating elements are connected for operation in two groups with the adjacent heating elements of each group separated by one of the heating elements of the other group; and said control means comprises means for supplying electrical current independently through said two groups.

8. The electric broiler of claim 7 in which said control means comprises means for alternately supplying electrical current to said groups in series and to said groups in parallel.

9. The electric broiler of claim 8 in which said control means also includes means for supplying electrical current to only one of said groups of heating elements.

10. An electric broiler comprising, a housing, a drip pan mounted on said housing and having an upwardly facing mouth, a grid of parallel grill bars mounted over the mouth of said pan, an electrical control box pivotally mounted on said housing adjacent said grid, a plurality of parallel heating elements extending from said control box and removably disposed parallel to and between the bars of said grid with the top surfaces of said heating elements spaced below the top surfaces of said bars, said heating elements being movable upwardly out of and away from said grid, a cover member mounted on the ends of said heating elements remote from said control box, and means for supplying electric current to said heating elements comprising first conducting means mounted in said control box and connected to a first group of said heating elements second conducting means mounted in said control box and connected to a second group of said heating elements, third conducting means mounted in said cover member connecting each of said heating elements of said first group to one of said heating elements of said second group, circuit means for connecting said first and second conducting means to the leads of a source of electrical current, and switching means for controlling the current flow in said circuit means.

11. The electric broiler of claim 10 in which the sides of said heating elements lie closely adjacent to the sides of said grill bars, and the lower surfaces of said heating elements lie above the lower surfaces of said grill bars.

12. The electric broiler of claim 10 in which said heating elements are elongated parallel resistance heating rods encased in generally cylindrical sheaths, said sheaths are threaded at both ends and extend into and are connected to said control box and said cover member by lock nuts, said heating rods are detachably connected to said conductors, and said cover and control box are provided with removable side members to permit access to the interior thereof for attaching said heating rods to said conductors.

13. The electric broiler of claim 10 in which said control box comprises first and second bodies detachably mounted together, said switching means and said circuit means are mounted in said first body, said heating elements extend from said second body, said first and second conductors are mounted in said second body and each carries a conductor prong extending from said second body into said first body and removably connected to said circuit means, and said cover member and said second body are impervious to water.

14. The electric broiler of claim 10 having spring means for supporting said control box and said heating elements in an upwardly rotated position in which said heating elements are remote from said grid.

15. The electric broiler of claim 10 in which said second conducting means comprises first and second conductors connected to separate subgroups of heating elements of said second group, the heating elements of said first and second subgroups together with the heating elements of said first group to which they are connected by said third conducting means comprising first and second heating units, and adjacent heating elements of each unit are separated from each other by one of the heating elements of the other unit.

16. The electric broiler of claim 15 in which said switching means comprises means for connecting said heating units alternately in series and in parallel across said leads and means for connecting one of said heating units across said leads independently of the other of said heating units.

17. An electrical heater comprising a control box, a plurality of elongated electrical resistance heating elements extending from said control box and encased in generally cylindrical sheaths which are threaded at both ends, a cover member mounted on the ends of said heating elements remote from said control box, the threaded ends of each of said sheath extending into said control box and said cover member, lock nuts attaching said sheaths to said control box and said cover member, and means for supplying electric current to said heating elements comprising first conducting means mounted in said control box and detachably connected to a first group of said heating elements, second conducting means mounted in said control box and detachably connected to a second group of said heating elements, third conducting means mounted in said cover member connecting each of said heating elements of said first group to one of said heating elements of said second group, circuit means for connecting said first and second conducting means to the leads of a source of electrical current, and switching means for controlling the current flow in said circuit means, said cover member and control box having removable sides positioned to permit access into the interiors thereof for detaching said heating elements from said conductors and for removing said lock nuts.

18. The electric heater of claim 17 in which said control box comprises first and second bodies detachably mounted together, said switching means and said circuit means are mounted in said first body, said heating elements extend from said second body, said first and second conductors are mounted in said second body and each carries a conductor prong extending from said second body into said first body and removably connected to said circuit means, and said cover member and said second body are impervious to water.

19. An electric broiler comprising, a drip pan having an open mouth in the top thereof, a grid of grill bars mounted closely adjacent to said mouth of said pan and lying substantially completely within the space defined by projecting said mouth vertically, a plurality of electric heating elements removably mounted between said bars of said grid with adjacent bars separated by one heating elements and with the top surfaces of said heating elements disposed below the top surface of said bars, and electrical control means connected to said heating elements for supplying electrical current thereto.

20. The electric broiler of claim 19 in which a housing is provided with an opening in the top thereof and an upwardly extending lip surrounding said opening; said drip pan is removably mounted in said opening of said housing with the edges of said pan embracing said lip, and the depth of said pan measured perpendicular to said mouth is small compared to the dimensions of said mouth.

References Cited in the file of this patent
UNITED STATES PATENTS

| | | |
|---|---|---|
| 2,790,887 | Gelfand | Apr. 30, 1957 |
| 2,856,502 | Wolf | Oct. 14, 1958 |
| 2,938,102 | Savio | May 24, 1960 |